Aug. 16, 1949.                P. ROSENBERG                2,479,264
                    COMBINED COAXIAL AND CRYSTAL HOLDER
Filed July 9, 1945                                      2 Sheets-Sheet 2

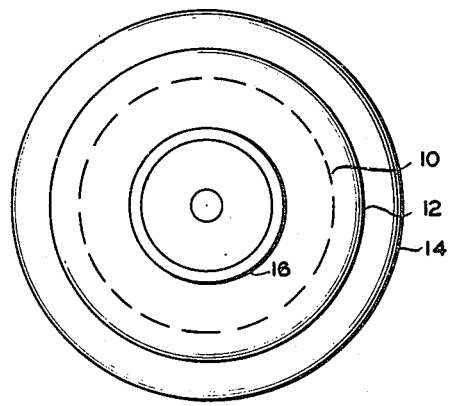
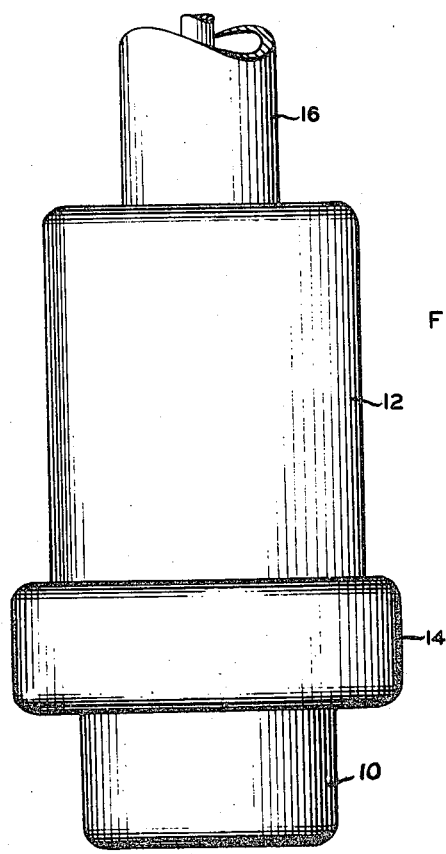

INVENTOR
PAUL ROSENBERG
BY William D. Hall.
ATTORNEY

Patented Aug. 16, 1949

2,479,264

UNITED STATES PATENT OFFICE 2,479,264

COMBINED COAXIAL AND CRYSTAL HOLDER

Paul Rosenberg, Brookline, Mass., assignor, by mesne assignments, to the United States of America as represented by the Secretary of War Application July 9, 1945, Serial No. 604,056

1 Claim. (Cl. 171—327)

This invention relates to crystal holders and more particularly to such holders designed to support supersonic crystals.

It is sometimes desirable to transmit pulses of supersonic energy through a liquid medium. Usually the frequency of oscillation of these pulses is in the neighborhood of several megacycles. The easiest way to produce these pulses is to support a crystal in this liquid medium and to pulse this crystal in such a manner that it will oscillate at the desired frequency. Several considerations must be kept in mind in the design of the support for the crystal. The length of life of the crystal and the stability of the crystal will depend to a large extent on the design of the crystal holder. The pattern of the supersonic waves in the liquid medium will also depend to some extent on the design of the crystal holder. Certain other considerations such as the interchangeability of the crystals do not actually affect the operation of the crystal but will increase the usefulness of the system as a whole.

It is an object of the present invention, therefore, to present a crystal holder designed to protect the crystal, to produce a suitable radiation pattern and to be interchangeable with other crystal units.

In accordance with the present invention there are provided a crystal cartridge for supporting the crystal, an adapter for connecting the crystal cartridge to a suitable coaxial transmission line and a retaining ring for clamping the crystal cartridge to the adapter.

For a better understanding of the invention, together with other and further objects thereof, reference is had to the following description taken in connection with the accompanying drawings in which:

Fig. 1 is a plan view of the crystal cartridge in the adapter;

Fig. 2 is an elevation showing the crystal cartridge, the adapter, and a section of coaxial transmission line to which the adapter is connected;

Referring now to Figs. 1 and 2, there is shown a crystal cartridge 10 clamped to an adapter 12 by a retaining ring 14. Adapter 12 is connected to a coaxial transmission line 16. The details of the construction of crystal cartridge 10 are more clearly shown in Fig. 3.

Figure 3:
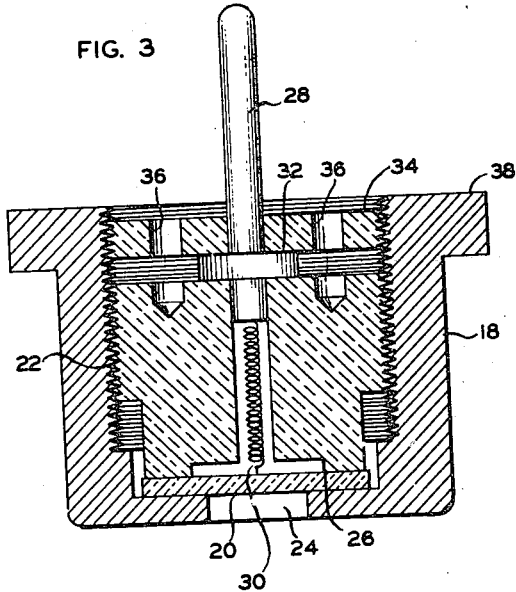
Fig. 3 is a sectional view of a crystal cartridge.

Referring now to Fig. 3, there is shown a metal cup 18 that forms the outside of a crystal cartridge. The crystal 20 is held against the bottom of cup 18 by means of an insulating plug 22. The interior of cup 18 and the exterior of plug 22 are threaded so that crystal 20 may be securely clamped in place. The surface of cup 18, where it makes contact with crystal 20, is machined so that a water-tight fit is made between cup 18 and crystal 20 when crystal 20 is clamped in place by plug 22. An opening 24 is formed in the bottom of cup 18, and it is through this opening that the supersonic energy pulse is transmitted to the liquid medium. Plug 22 is formed with a recess 26 at the point where it makes contact with crystal 20. This recess permits crystal 20 to vibrate freely. A hole is made in plug 22 so as to permit a connection to be made from the upper surface of crystal 20 to a connector 28. This connection is made by means of a flexible wire or "cat whisker" 30. Usually the upper and lower surfaces of crystal 20 will be metal plated so as to form two equipotential surfaces on crystal 20. The lower end of connector 28 is made the same size as the opening in plug 22. A ring 32 on connector 28 limits the distance that connector 28 may extend into plug 22. A second insulating plug 34 which is also threaded to fit the inside of plug 18 is used to clamp connector 28 in place. The holes 36 shown in plugs 22 and 34 provide a means for inserting a suitable tool for the purpose of tightening these plugs. When the crystal cartridge has been assembled, it may be desirable to pour a suitable sealing compound, for example melted wax, through one of the openings in plug 34 so that the upper end of the crystal cartridge is sealed against the entrance of moisture. This sealing compound is not shown in Fig. 3. The surface 38 of cup 18 is machined so that a water-tight fit is made with adapter 12.

Figure 4:
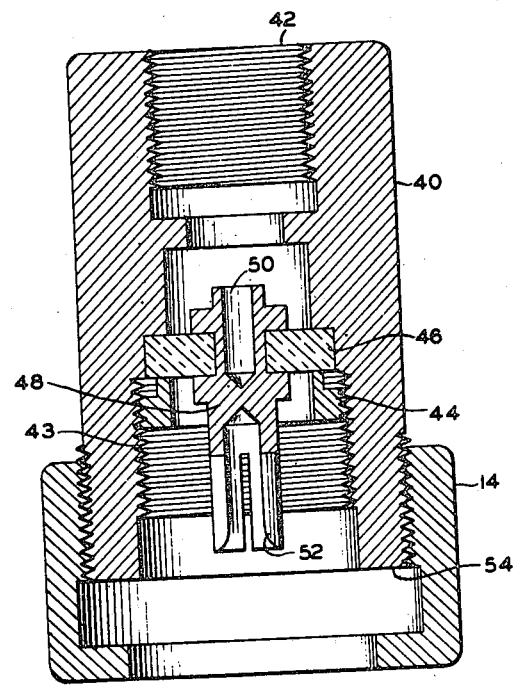
Fig. 4 is a sectional view of the adapter and retaining ring.

Referring now to Fig. 4, there is shown a sectional view of adapter 12 and retaining ring 14, the purpose of this adapter is to Fig. 2. The purpose of this adapter is to mechanically and electrically connect the crystal cartridge 10 to a suitable coaxial line. The design of adapter 12 will, therefore, depend on the size and shape of the crystal cartridge 10 and the size and shape of a coaxial line to which it is connected. Adapter 12 consists primarily of a metal sleeve 40 that has an opening 42 that is threaded to fit the coaxial line 16, Fig. 2. The lower end of sleeve 40 as shown in Fig. 4 is threaded on the inside to fit an insulating ring 44. This insulating ring 44 clamps an insulating disk 46 in a recess in sleeve 40. Disk 46 supports a connector 48. The upper end of connector 48 has an opening 50 into which the center conductor of the coaxial line extends. The lower end of connector 48 has an opening 52 into which the connector 28 of Fig. 3 extends. The lower end of connector 48 is split as indicated in Fig. 4 so as to provide a spring contact between connector 48 and connector 28 of Fig. 3. In connecting crystal cartridge 10 to adapter 12, the connector 28 on crystal cartridge 10 is inserted in the opening 52 of adapter 12. The surface 38 of cartridge 10 fits against the surface 54 of sleeve 40. Retaining ring 14 is threaded to fit the outside of sleeve 40. When retaining ring 14 is tightened, a water-tight joint is made between surface 54 and surface 38. The design of connector 48 and sleeve 40 that go to make up adapter 12 may be such that adapter 12 serves as an impedance transformer for electrically matching the impedance of the crystal to the impedance of the coaxial line 16 as well as a means for mechanically connecting cartridge 10 to coaxial line 16 as shown in Fig. 2.

A study of Figs. 1 through 4 will reveal the following advantages. The crystal 20 is held firmly in position, thus assuring the long life and stability of the crystal. The crystal cartridge and the adapter are designed so as to prevent the entrance of moisture into the crystal cartridge and the transmission line associated with the crystal. The radiation pattern of the crystal is controlled by the design in the opening in cup 18. In the event that a crystal has to be replaced, it is only necessary to unscrew clamping ring 14, remove the old crystal cartridge, insert a new crystal cartridge and replace retaining ring 14. Other advantages of the system will become apparent by careful study of the drawings and the included description.

While there has been described what is at present considered the preferred embodiment of the invention, it will be obvious to those skilled in the art that various changes and modifications may be made therein without departing from the invention.

What is claimed is:

An apparatus for supporting a crystal comprising a metallic cup formed with an opening in the bottom thereof, an insulating plug formed with a central opening therein and with screw threads on the exterior thereof to engage screw threads on the interior of said cup means whereby the crystal is clamped to the bottom of said cup means, an electrode, means for connecting said electrode to one side of the crystal, means for supporting said electrode in said central opening of said insulating plug, means for sealing said cup against the entrance of moisture, a coaxial transmission line having an inner and an outer conductor, a sleeve making mechanical and electrical contact with said outer conductor, means for mechanically and electrically connecting said cup to said sleeve, a connector for electrically and mechanically connecting said electrode to said inner conductor of said coaxial line, and means for supporting said connector means in the interior of said sleeve means.

PAUL ROSENBERG.

REFERENCES CITED

The following references are of record in the file of this patent:

UNITED STATES PATENTS

| Number | Name | Date |
|---|---|---|
| 2,096,826 | Schrader | Dec. 16, 1937 |
| 2,173,643 | Moser | Sept. 19, 1939 |